Sept. 11, 1951  A. W. GELPCKE  2,567,372
TOGGLE LOCK
Filed July 28, 1949

INVENTOR.
ALFRED W. GELPCKE
BY
A. D. T. Libby
Attorney

Patented Sept. 11, 1951

2,567,372

UNITED STATES PATENT OFFICE 2,567,372

TOGGLE LOCK

Alfred W. Gelpcke, Brooklyn, N. Y., assignor to The Rawlplug Company, Inc., New York, N. Y.

Application July 28, 1949, Serial No. 107,270

5 Claims. (Cl. 85—3)

This invention relates to a new and improved type of toggle lock for use in mounting devices on hollow tile, masonry, plaster walls or glasswool wall boards and the like.

In my Patent 2,398,220 of April 9, 1946, I have shown and described certain forms of toggle locks but further use of these devices and study of the problems encountered in practice has led to the device to be hereinafter described.

As set forth in said patent the toggle locks, in use prior to the advent of the forms shown therein, were all subject to at least one big fault i. e. there was no way to lock the toggle heads permanently in place so they would stay there when the holding studs or bolts, used to fasten a device or structure to the wall, were withdrawn for any reason, with the result that the toggle heads would drop down behind the wall and become lost.

Consequently, in using prior art toggle locks before the structures of my patent it was necessary to assemble the screw or bolt first with the structure to be fastened to the wall and then pass the screw or bolt into engagement with the nut in the toggle head. If a plurality of toggles were required, the holes therefor must be spotted and drilled in advance to insure correct position. It was also necessary to use extra long screws to permit the toggle head to be inserted far enough behind the masonry or panel to clear the wings of the toggle when it is swung into position behind the wall. Also it was necessary, in tightening the toggle head on the inside with the fixture or work on the outside, to pull on the screw and device to hold the toggle head against the inner wall surface so it would not rotate at the same time. This fault is very objectionable.

It is therefore the principal object of my invention to provide a toggle lock that overcomes said objectionable prior art features and furnish a toggle lock that can be fastened to the hidden wall surface entirely independent of and before the device, to be fastened in place, is attached to the outer wall face. This makes it very much faster, easier and cheaper to fasten the device in place on the wall. Furthermore if the device needs to be taken down and returned, the toggle lock will remain in place, or it may be removed and used elsewhere if required.

A further object is to provide a toggle lock that will fulfill the principal object but at a reduced cost of manufacture and installation. Further objects will appear after reading the following specification taken in connection with the annexed drawing wherein.

Figure 1:
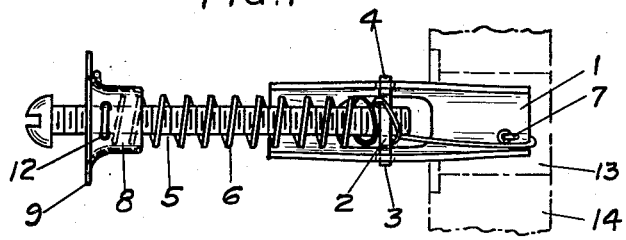
Figure 1 is a side view of one form on my improved device about to be inserted into a hole in the wall.
Figure 2:
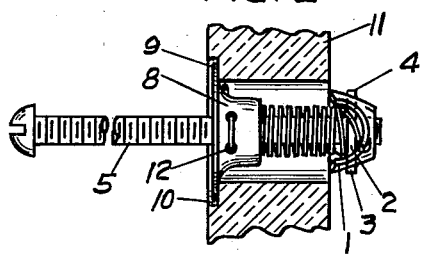
Figure 2 is a view of the device of Figure 1 in final position in the wall.
Figure 3:
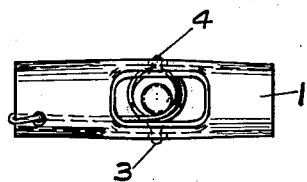
Figure 3 is an end view of the toggle lock head as shown in Figure 2.

Referring now to the details wherein, like numbers refer to corresponding parts in the different views, 1 is a head in which is pivotally mounted a nut 2 by reason of arms or lugs 3 and 4. The nut 2 is threaded to receive a screw or threaded stud 5. As shown in Figures 1 and 2 a spring 6 has one end operatively attached as at 7 to the head 1 and then passes over the nut 2 and extends spirally outwardly and has its outer end fastened to a guide member 8 which has a flange 9 adapted to preferably set into a recess 10 in the outer face of the wall structure 11. As shown the outer end of spring 6 is fastened to the guide 8 by having its end passed through a plurality of arcuately spaced holes 12 to hold the spring and guide securely together. Figure 1 shows the guide 8 pulled outwardly and the toggle head 1 tilted 90° from its holding position whereby it can be inserted through a hole 13 in the wall 14 by reason of the installing stud 5.

After the toggle head 1 has passed through the wall 14 the spring 6 will at once on being released tilt it into locking position, while at the same time the guide 8 will be drawn by the spring 6 into the position shown in Figure 2 after which the installing stud can be unscrewed from the nut 2 and the device or structure to be mounted on the outer face of the wall can be put in place and the holding screws or studs put into place by screwing them into their respective nuts 2.

Figure 4:
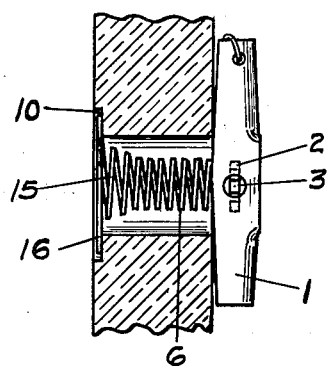
Figure 4 shows a modified means for holding the toggle head in operative position ready to receive the holding bolt.

In Figure 4 a somewhat different spring is used in that the outer convolutions 15 are enlarged in diameter with the last turn 16 lying in the recess 10.

Figure 5:
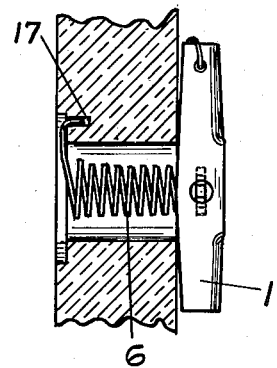
Figure 5 is a view similar to Figure 4 but showing a further form of toggle head holding means.

In Figure 5 the spring has its outer turn end bent inwardly into a small hole 17 but the spring in Figures 4 and 5 act on the toggle head just the same as in Figures 1 and 2.

It will be seen from these figures that my new design is very simple yet cheap to make and install, yet highly efficient in operation.

Having thus described my invention what I claim is:

1. A toggle lock for a holding bolt used in holding a device onto a hollow structure comprising, a toggle head pivotally carrying a member having a hole that is screw threaded to receive an installation screw threaded fastener, a spirally wound spring having an internal diameter large enough to freely pass the holding fastener and having one end permanently anchored to the toggle head, the anchorage being such as to cause the head to move at once to holding position immediately it is passed through a hole in said structure, a guide member having a stop positioned to engage the front surface of the structure to which the toggle lock is applied, the outer end of said spring being anchored to said guide member which is adapted to be displaced from the toggle head whereby the head and the screw threaded member carried thereby can be readily turned by the hand of an installer into axial alignment with the installation screw threaded fastener.

2. A toggle lock for a holding bolt used in holding a device onto a hollow structure comprising, a toggle head pivotally carrying a member having a hole that is screw threaded to receive an installation screw threaded fastener, a spirally wound spring having an internal diameter large enough to freely pass the holding fastener and having one end permanently anchored to the toggle head, the anchorage being such as to cause the head to move at once to holding position immediately it is passed through a hole in said structure, the outer end of said spring having turns of enlarged diameter to act as a stop against the front surface of the structure to which the toggle lock is applied, said turns also positioning the toggle head and its screw threaded member so the threaded hole of the latter is substantially in alignment with the axis of the spring.

3. A toggle lock for a holding bolt used in holding a device onto a hollow structure comprising, a toggle head pivotally carrying a member having a hole that is screw threaded to receive an installation screw threaded fastener, a spirally wound spring having an internal diameter large enough to freely pass the holding fastener and having one end permanently anchored to the toggle head, the anchorage being such as to cause the head to move at once to holding position immediately it is passed through a hole in said structure, the outer end of said spring having its end anchored directly to the outer portions of the structure to which the toggle lock is applied, to thereby hold the toggle head in the same position on the interior wall of the structure should the fastener and device be removed from the structure.

4. A toggle lock as set forth in claim 1 further defined in that the guide member is in the form of a collar fitting over the end spirals of the spring, the collar having a flat flange only a little larger in diameter than said collar for engaging the front surface of said structure, the collar having preferably a plurality of arcuately spaced holes to receive the free end of the spring, so it will hold the toggle head and its hole threaded member in operative position should the holding fastener be removed.

5. A toggle lock for a holding screw threaded fastener including a head and a nut pivotally mounted in the head, a spiral spring permanently attached to the head and associated with the nut to bias the head and nut into holding position substantially transverse to and with the nut in alignment with the axis of said spiral spring, said spring having an internal diameter large enough to pass an installation screw threaded fastener, said spring also adapted to extend through a hole in a structure and having its outer end anchored so as to hold said head in working position whenever the holding screw threaded fastener is withdrawn, said spring being under very little tension when the fastener is in or out of device holding position.

ALFRED W. GELPCKE.

REFERENCES CITED

The following references are of record in the file of this patent:

UNITED STATES PATENTS

| Number | Name | Date |
|---|---|---|
| 1,506,123 | Hubener | Aug. 26, 1924 |
| 1,521,025 | Hubener | Dec. 30, 1924 |
| 2,159,454 | Shoup | May 23, 1939 |
| 2,203,146 | Hexdall | June 4, 1940 |
| 2,398,220 | Gelpcke | Apr. 9, 1946 |